(12) United States Patent
Ganev et al.

(10) Patent No.: US 8,933,658 B2
(45) Date of Patent: Jan. 13, 2015

(54) THERMAL PROTECTION METHOD AND SYSTEM TO MAXIMIZE AVAILABILITY OF ELECTRIC DRIVE SYSTEM

(71) Applicant: Honeywell International, Inc. Patent Services M/S AB/2B, Morristown, NJ (US)

(72) Inventors: Evgeni Ganev, Torrance, CA (US); Chiyuan Chiang, Granada Hills, CA (US)

(73) Assignee: Honeywell International Inc., Morristown, NJ (US)

( * ) Notice: Subject to any disclaimer, the term of this patent is extended or adjusted under 35 U.S.C. 154(b) by 171 days.

(21) Appl. No.: 13/736,878

(22) Filed: Jan. 8, 2013

(65) Prior Publication Data

US 2014/0191695 A1   Jul. 10, 2014

(51) Int. Cl.
*H02P 3/00* (2006.01)
*H02P 7/00* (2006.01)

(52) U.S. Cl.
USPC .......................... 318/472; 318/471; 318/473

(58) Field of Classification Search
USPC ............ 318/139, 471–473; 701/22; 340/441; 180/65.265
See application file for complete search history.

(56) References Cited

U.S. PATENT DOCUMENTS

| | | | | |
|---|---|---|---|---|
| 4,779,577 A | * | 10/1988 | Ritter et al. | 123/41.05 |
| 5,483,927 A | * | 1/1996 | Letang et al. | 123/41.12 |
| 6,199,001 B1 | * | 3/2001 | Ohta et al. | 701/51 |
| 6,345,529 B1 | * | 2/2002 | Eskilson | 73/115.02 |
| 6,434,466 B1 | * | 8/2002 | Robichaux et al. | 701/54 |
| 6,480,767 B2 | * | 11/2002 | Yamaguchi et al. | 701/22 |
| 6,584,392 B1 | * | 6/2003 | Jankovic et al. | 701/54 |
| 6,589,136 B2 | * | 7/2003 | Ephraim et al. | 477/111 |
| 7,481,200 B2 | * | 1/2009 | Uplap et al. | 123/352 |
| 7,739,005 B1 | * | 6/2010 | Tang | 701/22 |
| 7,742,852 B1 | * | 6/2010 | Tang | 701/22 |
| 7,747,363 B1 | * | 6/2010 | Tang | 701/22 |
| 7,884,577 B2 | * | 2/2011 | Tsutsumi et al. | 320/150 |
| 8,062,170 B2 | * | 11/2011 | West et al. | 477/3 |

(Continued)

FOREIGN PATENT DOCUMENTS

DE   102007042774 A1   3/2008
DE   102008001782 A1   11/2009

(Continued)

OTHER PUBLICATIONS

Real-time prediction of torque availability of an IPM synchronous machine drive for hybrid electric vehicles, Fu, Z.X., Adv. Powertrain Syst., Visteon Corp., MI, USA, *International Electric Machines and Drives Conference (IEEE Cat. No. 05EX1023C)*, 199-206, 2005.

(Continued)

*Primary Examiner* — Paul Ip
(74) *Attorney, Agent, or Firm* — Shimokaji & Assoc., P.C.

(57) ABSTRACT

An electric drive system may include a plurality of heat sensitive components, at least one temperature sensor positioned in or on each of the components and a system controller. The temperature sensors may be interconnected with the system controller to transmit temperature data from their respective heat sensitive components to the system controller. The system controller may be configured to transmit a reduced performance command in the event that a reached-temperature-threshold-limit signal is received from any one or more of the temperature sensors. System shutdown due to over temperature faults may be avoided.

20 Claims, 4 Drawing Sheets

(56) References Cited

U.S. PATENT DOCUMENTS

| | | | |
|---|---|---|---|
| 8,166,942 B2* | 5/2012 | Uplap et al. | 123/179.16 |
| 8,244,427 B2* | 8/2012 | Weiss et al. | 701/29.7 |
| 8,565,969 B2* | 10/2013 | Bradley et al. | 701/36 |
| 8,594,872 B2* | 11/2013 | Ichimoto | 701/22 |
| 8,606,443 B2* | 12/2013 | Pandit et al. | 701/22 |
| 8,653,960 B2* | 2/2014 | Hanna et al. | 340/441 |
| 8,761,985 B2* | 6/2014 | Tang | 701/22 |
| 2002/0062183 A1* | 5/2002 | Yamaguchi et al. | 701/22 |
| 2004/0069546 A1* | 4/2004 | Lou et al. | 180/65.2 |
| 2004/0129465 A1* | 7/2004 | Yamaguchi | 180/65.2 |
| 2006/0042590 A1* | 3/2006 | Uplap et al. | 123/352 |
| 2007/0032342 A1* | 2/2007 | Meyer et al. | 477/115 |
| 2007/0210769 A1* | 9/2007 | Tsutsumi et al. | 323/269 |
| 2007/0212598 A1* | 9/2007 | Iida et al. | 429/62 |
| 2008/0034767 A1* | 2/2008 | Ziehr et al. | 62/180 |
| 2009/0088294 A1* | 4/2009 | West et al. | 477/98 |
| 2010/0065355 A1* | 3/2010 | Reddy | 180/65.31 |
| 2011/0114739 A1* | 5/2011 | Misumi et al. | 236/49.3 |
| 2011/0202234 A1* | 8/2011 | Bradley et al. | 701/36 |
| 2012/0037352 A1* | 2/2012 | Osaka et al. | 165/202 |
| 2012/0153718 A1* | 6/2012 | Rawlinson et al. | 307/10.1 |
| 2012/0188068 A1* | 7/2012 | Hanna et al. | 340/441 |
| 2012/0203417 A1* | 8/2012 | Matsui | 701/22 |
| 2013/0319029 A1* | 12/2013 | Sekiya et al. | 62/238.7 |
| 2014/0041179 A1* | 2/2014 | Bradley et al. | 29/401.1 |
| 2014/0095017 A1* | 4/2014 | Houle et al. | 701/33.9 |

FOREIGN PATENT DOCUMENTS

| | | |
|---|---|---|
| JP | 2010022123 | 1/2010 |
| KR | 2012063689 | 6/2012 |

OTHER PUBLICATIONS

Self-tuning thermal protection scheme for induction machines, Hurst, K.D.1; Habetler, T.G., Georgia Inst of Technology, Atlanta, United States, *PESC Record—IEEE Annual Power Electronics Specialists Conference*, v 2, p. 1535-1541, 1996.

* cited by examiner

THERMAL PROTECTION METHOD AND SYSTEM TO MAXIMIZE AVAILABILITY OF ELECTRIC DRIVE SYSTEM

BACKGROUND OF THE INVENTION

The present invention generally relates to electric drive systems and more particularly to methods and apparatus for providing thermal protection for such systems.

A high-power electric drive system contains many components that are subject to substantial amounts of heat load. All these components may have their own thermal designs for heat rejection and are usually equipped with temperature sensors for protection from over-temperature. Typical operation of the system is to allow full performance until a component exceeds a safe temperature limit, and then the whole system will shut down. A system controller may restart the system after the component temperature cools down. However, during shutdown, the system is not available for operation. For some applications, this is not a desirable or even acceptable condition. The issue can be more complicated when the components of the system are installed in different environments.

As can be seen, there is a need for a thermal protection system that may allow a drive system to continue operation during periods when the temperature of one or more of its components approaches a predetermined safe limit.

SUMMARY OF THE INVENTION

In one aspect of the present invention, an electric drive system may comprise: a plurality of heat sensitive components; at least one temperature sensor positioned in or on each of the components; and a system controller, the temperature sensors being interconnected with the system controller to transmit temperature data from their respective heat sensitive components to the system controller, the system controller being configured to transmit a reduced performance command in the event that a reached-temperature-threshold-limit signal is received from any one or more of the temperature sensors.

In another aspect of the present invention, a system controller for an electric drive system may comprise: a temperature comparator configured to receive inputs from temperature sensors located on or in a plurality of components of the electric drive system; and a command generator interconnected with the temperature comparator and interconnected with a motor controller of the electric drive system to transmit a reduced performance command to the motor controller responsively to receipt of a reached-temperature-threshold-limit signal being received by the temperature comparator.

In still another aspect of the present invention, a method for operating an electric drive system may comprise the steps of: establishing temperature threshold limits for a plurality of components of the electric drive system, the temperature threshold limit for any particular one of the plurality of components being at a temperature lower than temperature shutdown limit for the particular one of the plurality of components; monitoring temperatures of the plurality of components to detect if the temperature of any particular one of the plurality of components reaches the temperature threshold limit for said particular one of the plurality of components; and initiating a reduction in performance of the electric drive system in the event that the temperature of any particular one of the plurality of components reaches the threshold limit for said particular one of the plurality of components.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide methods and apparatus that prevent a drive system from shutdown by reducing system performance when the temperature of any component of the drive system rises above a preset threshold value. A preset temperature threshold that is less than a shutdown temperature limit may be determined for each temperature-monitored component within the system. Any component temperature that goes above its threshold limit may trigger a system controller to initiate self-protection mode. In this mode, the controller may limit the appropriate system performance parameters to tame component temperature behavior. While in the self-protection mode of operation, the system may experience some degradation in performance, but a complete system shutdown may be avoided.

Figure 1:
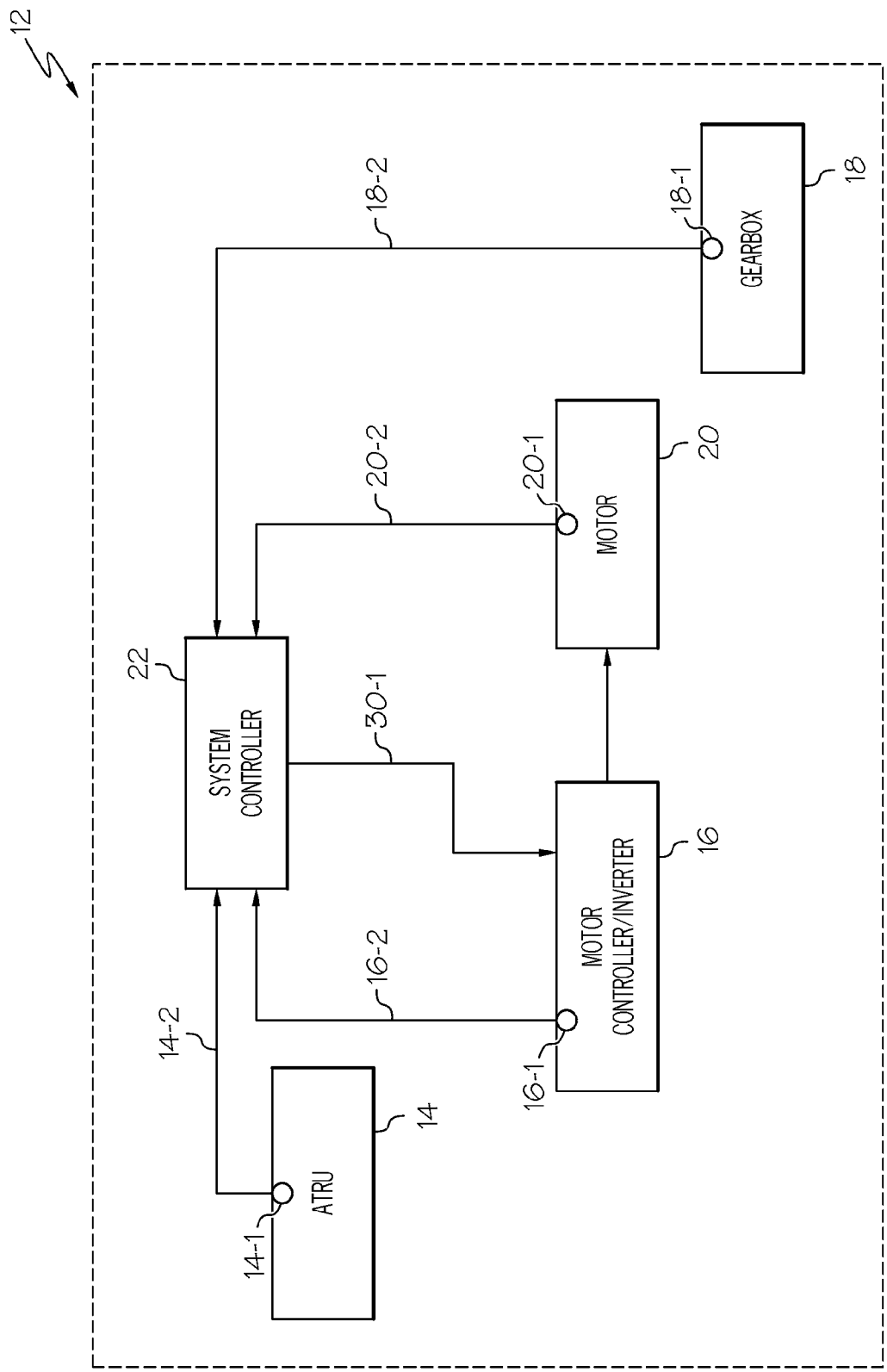
FIG. 1 is block diagram that schematically illustrates an electric drive system in accordance with an exemplary embodiment of the present invention.

Referring now to FIG. 1, there is shown, an exemplary electric drive system 12 such as a drive system that may be employed in an aircraft electric taxi system (ETS). In an ETS, an airplane (not shown) may use an auxiliary power unit (not shown) to power the drive system 12 to taxi in and/or out of a runway. All or part of the airplane engines may be turned off during taxiing to save fuel. The electric drive system 12 may include an autotransformer rectifier unit (ATRU) 14, a motor controller/inverter 16, a gearbox 18 and a traction motor 20. Temperature sensors 14-1, 16-1, 18-1 and 20-1 may be positioned in the ATRU 14, the motor controller/inverter 16, the gearbox 18 and the traction motor 20 respectively. The temperature sensors 14-1, 16-1, 18-1 and 20-1 may be configured and interconnected with the system controller 22 to continually transmit temperature data to a system controller 22. In some embodiments of the system 12, the motor controller/inverter 16 may perform some or all of the roles of the system controller 22.

The temperature sensors 14-1, 16-1, 18-1 and 20-1 may transmit an ATRU temperature signal 14-2, a motor controller temperature signal 16-2, a gearbox temperature signal 18-2 and a motor temperature signal 20-1 respectively.

It should be noted that while FIG. 1 symbolically shows only a single temperature sensor in each of the ATRU 14, the motor controller/inverter 16, the gearbox 18 and the traction motor 20, this symbolic representation is made for purposes of simplicity. In reality, multiple temperature sensors may be positioned in one or more of the components of the electric drive system 12. For example, the motor 20 may be provided with a first temperature sensor near one of its bearing, a second sensor near another one of its bearings and a third sensor near its stator winding. Similarly, the gearbox 18 may be provided with multiple temperature sensors near its bearings and still another sensor adapted to measure lubricant temperature.

Figure 2:
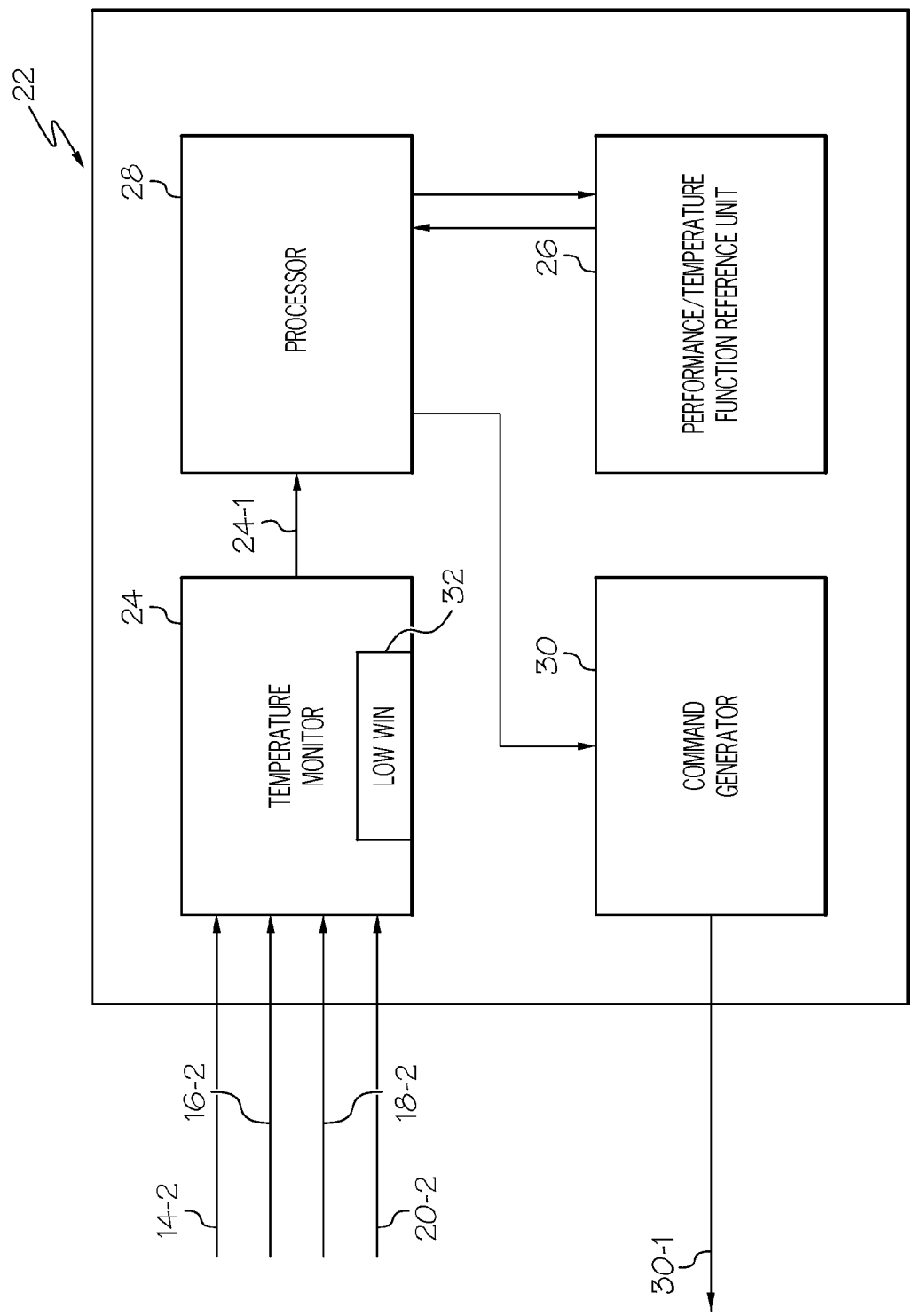
FIG. 2 is a block diagram that schematically illustrates a system controller in accordance with an exemplary embodiment of the present invention.

Referring now to FIG. 2, an exemplary embodiment of the system controller is shown in block diagram format. The system controller 22 may include a temperature monitor 24, a memory or reference unit 26, a processor 28 and a command generator 30.

In operation, the system controller 22 may continually receive temperature signals such as the signals 14-2, 16-2, 18-2 and 20-2. If one or more of the temperature signals presents a temperature above a threshold temperature for a particular component of the electric drive system 12, then the system controller 22 may act to produce a command for performance reduction of the electric drive system 12. In this regard, the system controller may be considered to receive a reached-temperature-threshold-limit signal. In an exemplary mode of operation, the temperature monitor 24 may transmit a threshold-exceed signal 24-1 to the processor 28. The processor 28 may interact with the reference unit 26 to determine a type and magnitude of performance reduction that may be needed to reconcile the threshold-exceed signal 24-1. The processor 28 may then interact with the command generator 30 so that the command generator 30 may produce a performance reduction command 30-1 to the motor controller 16 of FIG. 1. The motor controller 16 may then reduce voltage applied to the motor 20 (see FIG. 1) or reduce current provided to the motor 20. Voltage reduction may be used to reduce performance under conditions in which speed reduction is desired. Current reduction may be used to reduce performance under conditions in which acceleration reduction is desired.

In some circumstances, threshold exceeding temperatures may develop in more than one component of the electric drive system 12. The system controller 22 may be provided with a low-win logic circuit 32 to deal with such a condition. The low-win logic circuit 32 may select which one of multiple reached-temperature-threshold-limit signals may require the greatest amount of performance reduction for achievement of mitigation of high temperature. The selected signal may then be used as the threshold-exceed signal 24-1 for transmittal to the processor 28 and ultimately for selection of the performance reduction command 30-1.

The reference unit 26 may store component-specific functional relationships between types, magnitudes and/or rates of performance reduction and corresponding rates of temperature decrease that may be produced by a particular performance reduction. The reference unit 26 may be programmed to utilize various algorithms such as polynomial functions and look-up tables to store its relevant functional relationships.

Figure 3:
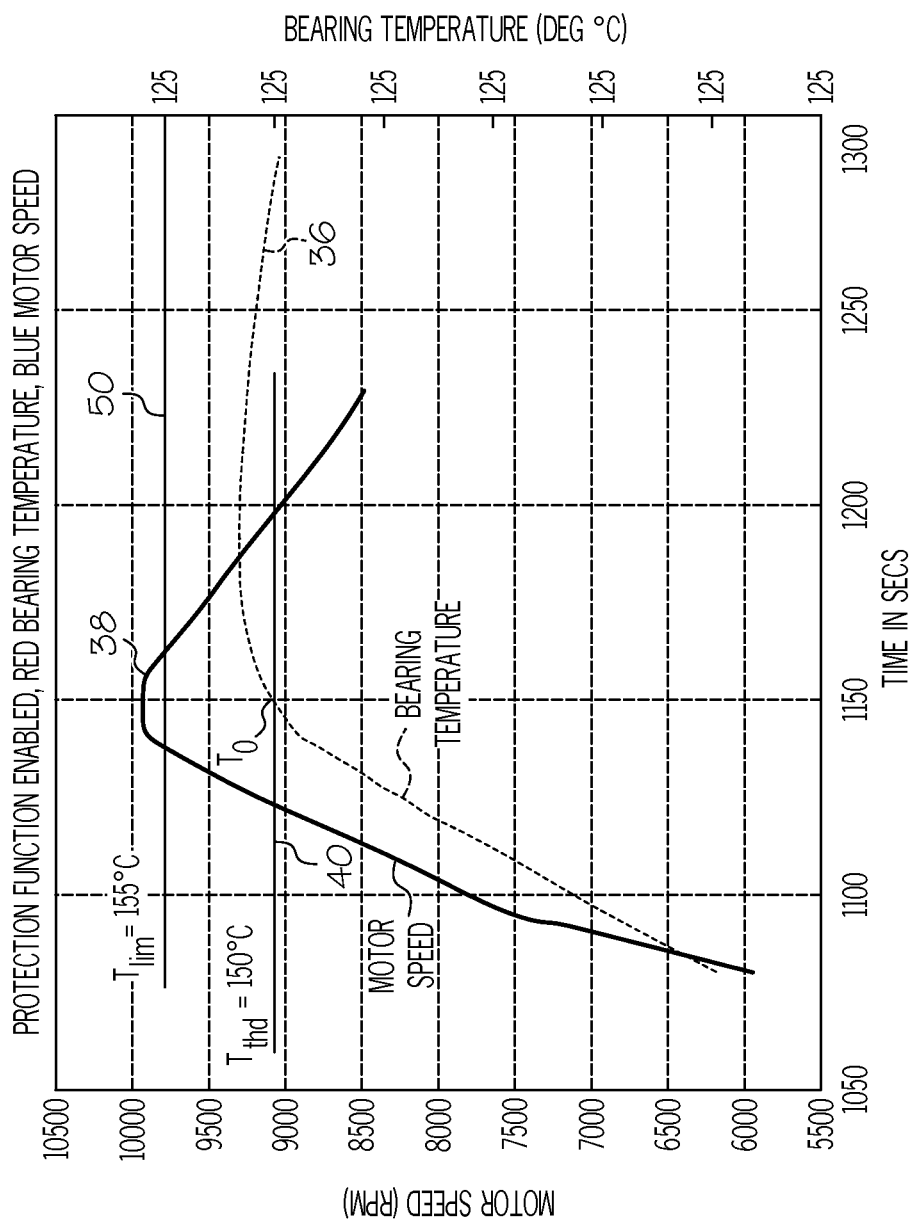
FIG. 3 is a graph illustrating a relationship between temperature of a component of the electric drive system of FIG. 1 and speed of a motor of the electric drive system of FIG. 1.

For example, the reference unit 26 may store a functional relationship of rate of performance reduction vs. rate of temperature decrease for a bearing in the motor 20 that is illustrated in a functional relationship shown in FIG. 3. In FIG. 3 a graph line 36 illustrates bearing temperature and a graph line 38 illustrates motor speed. It may be seen that at a time $T_O$ when bearing temperature 36 exceeds a threshold temperature 40 of 150° C., motor speed 38 may be decreased at a rate of about 1500 revolutions per minute (rpm) in 75 seconds. This rate of change of speed (i.e. performance reduction) may reduce an increase of bearing temperature 36 and ultimately may reduce the bearing temperature 36. It may also be seen that the motor speed 38 may be maintained at a speed of 8500 rpm until the bearing temperature 36 returns to a level equal to the threshold temperature 40. In the example of FIG. 3, the bearing temperature 36 may never reach a safety shutdown limit temperature 50 and thus shutdown of the electric drive system 12 may be avoided.

Figure 4:
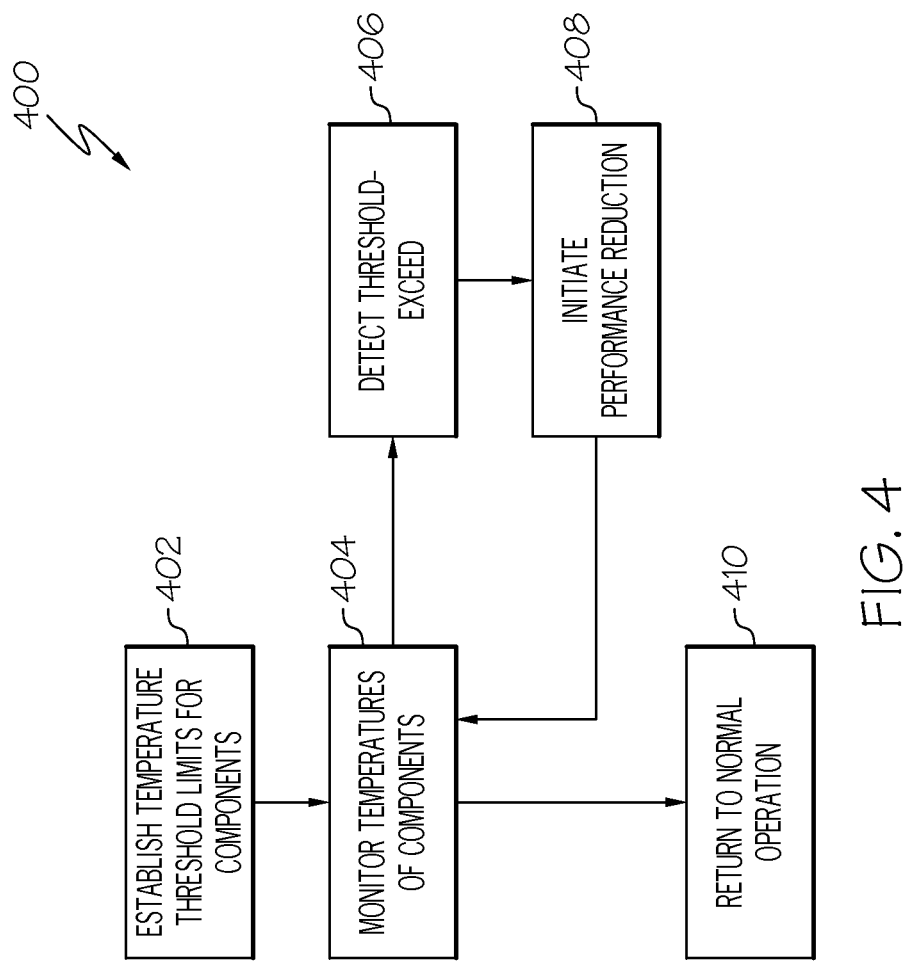
FIG. 4 is a flow chart of a method for operating the electric drive system of FIG. 1 in accordance with an exemplary embodiment of the present invention.

Referring now to FIG. 4, a flow chart 400 illustrates a method that may be employed to operate the electric drive system 12 in a manner that may provide thermal protection and avoid shutdown in the event of temperature increases of one or more components of the electric drive system 12. In a step 402, temperature threshold limits may be established for a plurality of components of the electric drive system, the temperature threshold limit for any particular one of the plurality of components being at a temperature lower than temperature shutdown limit for the particular one of the plurality of components (e.g. the threshold temperature limit 40 of FIG. 3 may be established at a temperature level lower than the safety shutdown limit temperature 50 of FIG. 3). In a step 404, temperatures of a plurality of components may be monitored to detect if the temperature of any particular one of the plurality of components reaches the temperature threshold limit for said particular one of the plurality of components (e.g. the temperature monitor 24 may monitor temperature signals such as the signals 14-2, 16-2, 18-2 and 20-2). In a step 406, determination may be made if one or more threshold temperatures are exceeded. In a step 408, a reduction in performance of the electric drive system may be initiated in the event that the temperature of any particular one of the plurality of components reaches the threshold limit for said particular one of the plurality of components. In the step 404, determination may be made that after initiation of performance reduction in step 408, the temperature threshold may no longer be exceeded. In step 410 normal operation of the electric drive system may be restored.

It should be understood, of course, that the foregoing relates to exemplary embodiments of the invention and that modifications may be made without departing from the spirit and scope of the invention as set forth in the following claims.

We claim:

1. An electric drive system comprising:
a plurality of heat sensitive components;
a plurality of temperature sensors in temperature communication with heat sensitive components;
a system controller having a processor in bilateral communication with a reference unit;
wherein the system controller continually receives temperature signals from the temperature sensors;
wherein, if one of the temperature signals presents a temperature above a respective threshold temperature for a particular heat sensitive component, then:
the system controller receives a threshold exceed signal;
the processor interacts with the reference unit to determine a type and magnitude of performance reduction to reconcile the threshold exceed signal; and
the processor causes the system controller to produce a reduced performance command for performance reduction of the drive system.

2. The electric drive system of claim 1 wherein the system controller is interconnected with a motor controller and the reduced performance command is transmitted to the motor controller through said interconnection.

3. The electric drive system of claim 2 wherein the motor controller is one heat sensitive component of the plurality of heat sensitive components.

4. The electric drive system of claim 1 wherein the reduced performance command comprises a speed reduction command.

5. The electric drive system of claim 4 wherein the motor controller is configured to reduce voltage to a motor of the drive system upon receipt of the speed reduction command.

6. The electric drive system of claim 2 wherein the reduced performance command comprises an acceleration reduction command.

7. The electric drive system of claim 6 wherein the motor controller is configured to reduce current to a motor of the drive system upon receipt of the acceleration reduction command.

8. An electric drive system comprising:
a rectifier;
a controller/inverter;
a gearbox;
a motor;
a system controller having a processor in bilateral communication with a reference unit;
wherein the system controller continually receives temperature signals from the rectifier, controller/inverter, gearbox, and motor;
wherein, if one of the temperature signals presents a temperature above a respective threshold temperature for one of the rectifier, controller/inverter, gearbox, and motor, then:
the system controller receives a threshold exceed signal;
the processor interacts with the reference unit to determine a type and magnitude of performance reduction to reconcile the threshold exceed signal; and
the processor causes the system controller to produce a reduced performance command for performance reduction of the drive system.

9. The drive system of claim 8:
wherein the reference unit is configured to store functional relationships between rates of change of temperatures and with types, magnitudes or rates of performance reduction of the rectifier, controller/inverter, gearbox, and motor; and
further comprising a command generator provided with component specific instructions relating to types, magnitudes or rates of performance reductions commands to produce.

10. The drive system of claim 9 wherein the reference unit is programmed with look-up tables and predetermined mathematic functions.

11. The drive system of claim 9 wherein the command generator is configured to produce performance reduction commands in the form of speed reduction commands.

12. The drive system of claim 9 wherein the command generator is configured to produce performance reduction commands in the form of acceleration reduction commands.

13. The drive system of claim 9:
wherein the command generator is configured to produce performance reduction commands in the form of speed reduction commands and said speed reduction commands are commands for reduction of voltage provided to the motor by the controller/inverter; and
wherein the command generator is configured to produce performance reduction commands in the form of acceleration reduction commands and said acceleration reduction commands are commands for reduction of current provided to the motor by the controller/inverter.

14. The drive system of claim 9 further comprising:
a low win logic circuit configured to determine which one of a plurality of reached-temperature-threshold-limit signals requires the most performance reduction to achieve mitigation.

15. A method for operating an electric taxi system comprising the steps of:
establishing temperature threshold limits for a plurality of heat sensitive components of the electric taxi system;
wherein the heat sensitive components includes a motor having a bearing;
continually receiving temperature signals from the bearing;
wherein, if one of the temperature signals presents a temperature above a threshold temperature for the bearing, then:
generating a threshold exceed signal;
determining a type and magnitude of performance reduction to reconcile the threshold exceed signal; and
producing a reduced performance command for performance reduction of the motor.

16. The method of claim 15 further comprising the step of maintaining the electric taxi system in a state of reduced performance until the temperatures of all of the heat sensitive components are below their respective temperature threshold limits.

17. The method of claim 15 wherein the step of initiating a reduction in performance further comprises commanding a motor controller of the electric taxi system to reduce speed of the motor.

18. The method of claim 15 wherein the step of initiating a reduction in performance further comprises commanding a motor controller of the electric taxi system to reduce acceleration of the motor.

19. The method of claim 15 further comprising the step of determining a functional relationship between performance reduction and rate of temperature decrease for each of the heat sensitive components.

20. The method of claim 19 further comprising commanding a motor controller of the electric taxi system to reduce speed or acceleration of the motor in accordance with the functional relationship between performance reduction and rate of temperature decrease.

* * * * *